United States Patent
Toda et al.

(10) Patent No.: US 8,790,574 B2
(45) Date of Patent: *Jul. 29, 2014

(54) THRUST BEARING FOR TURBOCHARGER OF INTERNAL-COMBUSTION ENGINE

(75) Inventors: Kazuaki Toda, Inuyama (JP); Satoru Kurimoto, Inuyama (JP); Ryo Sato, Inuyama (JP)

(73) Assignee: Daido Metal Company, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/420,029

(22) Filed: Mar. 14, 2012

(65) Prior Publication Data

US 2012/0251383 A1    Oct. 4, 2012

(30) Foreign Application Priority Data

Mar. 31, 2011    (JP) .................................. 2011-081301

(51) Int. Cl.
*C22C 9/04*    (2006.01)
*C22C 30/02*    (2006.01)

(52) U.S. Cl.
USPC ......................................... 420/482; 420/587

(58) Field of Classification Search
USPC ................................. 420/482, 587
See application file for complete search history.

(56) References Cited

U.S. PATENT DOCUMENTS

2011/0211781 A1*    9/2011    Toda et al. .................... 384/416

FOREIGN PATENT DOCUMENTS

| EP | 1281838 A2 | 2/2003 |
| EP | 2135964 A2 | 12/2009 |
| GB | 2478413 A | 9/2011 |
| JP | 2003-42145 A | 2/2003 |
| JP | 2009-007673 | 1/2009 |

OTHER PUBLICATIONS

Combined Search and Examination Report in application No. GB1205826.9 dated Jul. 2, 2012.
Korean Office action mailed Apr. 3, 2013, in connection with corresponding application; no English translation readily avaiable.

* cited by examiner

*Primary Examiner* — Rebecca Lee
(74) *Attorney, Agent, or Firm* — Browdy and Neimark, PLLC

(57) ABSTRACT

A thrust bearing for a turbocharger of an internal-combustion engine is made of a copper alloy including a brass matrix and a needle-like Mn—Si-based compound dispersed in the brass matrix. Not less than 50% of the needle-like Mn—Si-based compound dispersed in a region from a surface of a sliding portion of the thrust bearing to a depth of 50 μm have a major axis extending from the inside of the sliding portion to the surface. The major axis makes an angle of 30° to 150° with the surface of the sliding portion when observed in a sectional view perpendicular to the surface of the sliding portion.

3 Claims, 1 Drawing Sheet

THRUST BEARING FOR TURBOCHARGER OF INTERNAL-COMBUSTION ENGINE

BACKGROUND OF THE INVENTION

1. Technical Field

The present invention relates to a thrust bearing suitable for a turbocharger of an internal-combustion engine having improved seizure resistance.

2. Background of the Invention

A rotating shaft for a turbocharger of an internal-combustion engine is supported by a radial bearing and a thrust bearing located in a bearing housing. A turbine blade is fixed on an end of the shaft, and a compressor blade is fixed on the other end. The thrust bearing is engaged with a thrust collar and located. When the thrust collar integrated with the turbine blade is rotated at a high speed during operation of the turbocharger, the thrust bearing is slid against the thrust collar.

Consequently, resistance to corrosion and abrasion is required for a sliding portion of the thrust bearing that slides on the thrust collar. As a material for the sliding portion of the thrust bearing, used is brass in which a Mn—Si-based compound (hereinafter referred to as "needle-like Mn—Si-based compound") deposited in a needle shape in a brass matrix is dispersed, as disclosed in JP-A-2003-42145. JP-A-2003-42145 discloses that abrasion resistance of the thrust bearing is improved by arranging so that a length direction of the Mn—Si-based compound is parallel to a surface of the sliding portion in the thrust bearing.

BRIEF SUMMARY OF THE INVENTION

However, since the needle-like Mn—Si-based compound dispersed in the matrix extends in a direction parallel to the surface of the sliding portion, that is, a major axis of the needle-like Mn—Si-based compound is in parallel with the sliding face, in JP-A-2003-42145, about a half of outer surface of a grain of the needle-like Mn—Si-based compound exposes on the sliding surface and does not bound to the brass matrix. Thus, the grain is easily subjected to be sheared by sliding and detached from the surface of the bearing. The detached Mn—Si-based compound may behave as a foreign matter, and possibly damage the surface of the bearing and the shaft during sliding. Finally, seizure possibly occurs.

The invention is made in order to solve the above problems. The objective of the invention is to provide a thrust bearing for a turbocharger of an internal-combustion engine having improved seizure resistance.

According to an aspect of the invention, provided is a thrust bearing for a turbocharger of an internal-combustion engine. The thrust bearing is made of a copper alloy comprising a brass matrix and a needle-like Mn—Si-based compound dispersed in the brass matrix. Not less than 50% of the needle-like Mn—Si-based compound dispersed in a region from a surface of a sliding portion of the thrust bearing to a depth of 50 μm have a major axis extending from the inside of the sliding portion to the surface of the sliding portion makes an angle of 30° to 150° with the surface of the sliding portion, as observed by a sectional view perpendicular to the surface of the sliding portion.

The needle-like Mn—Si-based compound is of a type of a molecular composed of five Mn atoms and three Si atoms, and is dispersed in a form of needle-like grains in the brass matrix of the copper alloy. In addition to the needle-like Mn—Si-based compound, a granular form of the Mn—Si-based compound may be deposited and dispersed in the copper alloy matrix.

By controlling the angle between the major axis direction of the needle-like Mn—Si-based compound in the sectional view perpendicular to the surface to be 30° to 150°, the grains of the needle-like Mn—Si-based compound in the vicinity of the sliding surface can contact the brass matrix, and is tightly fixed to the matrix. As a result, dropout of the grains of the needle-like Mn—Si-based compound due to sliding is inhibited, and seizure can be prevented without damaging the surfaces of the bearing and the shaft while they are sliding. When less than 50% of the total of the grains of the needle-like Mn—Si-based compound make the angle to the surface of the sliding portion being 30° to 150°, a ratio of dropping grains is relatively increased, and the seizure is not be completely prevented.

The inventors have confirmed that when not less than 50% of the total grains of the needle-like Mn—Si-based compound have a major axis making an angle of 45° to 135° with the surface of the sliding surface, seizure resistance can be improved at a higher level. The depth of the region where the major axis direction of the needle-like Mn—Si is controlled is set at 50 μm from the sliding surface, since the maximum allowable abrasion depth of the thrust bearing in the turbocharger of internal-combustion engine is 50 μm.

When a temperature of the thrust bearing during operation of the turbocharger is elevated, an arrangement of metal atoms constituting the brass matrix around the needle-like Mn—Si-based compound has lattice defects (i.e. lattice strains) strain due to a difference in the thermal expansion between the brass matrix and the needle-like Mn—Si-based compound on the surface of the sliding portion. The brass matrix having these lattice defects (i.e. lattice strains) becomes active, and easily reacts with sulfur in a lubricant.

In an embodiment, an average distance between the grains of the needle-like Mn—Si-based compound dispersed in the brass matrix near the surface of the sliding portion may be 5 to 80 μm. Then, an entire brass matrix on the surface of sliding portions in the thrust bearing evenly receives the effect due to the difference in thermal expansion of the needle-like Mn—Si-based compound, and the entire surface of the sliding portion evenly becomes active, so that a sulfide film can be early formed on the surface of the brass matrix in the sliding portion. The average distance between the grains means an average distance between the grain of the needle-like Mn—Si-based compound and other closest grain. It means average length of the brass matrix between the grains of the needle-like Mn—Si-based compound. As described, since the nonmetallic sulfide film is early formed on the surface of the brass matrix during the operation of the turbocharger when the average distance between the grains of the needle-like Mn—Si-based compound dispersed in the brass matrix on the surface of the sliding portion is 5 to 80 μm, while the opposing shaft is made of metal, sliding between metallic surfaces is prevented, and the seizure resistance of the thrust bearing can be improved.

If the average distance between the grains of the needle-like Mn—Si-based compound is shorter while same amounts of Mn and Si is contained as the above, the needle-like Mn—Si-based compound becomes minute. When the average distance is less than 5 μm, it is confirmed by experiments that the needle-like Mn—Si-based compound becomes too minute, and wear resistance becomes small. On the other hand, when the average distance exceeds 80 μm, the sulfide film is hard to be formed since the brass matrix in the vicinity of a center between the grains of the needle-like Mn—Si-based compound hardly receives the effect by the difference of thermal expansion when the turbocharger is in operation.

In an embodiment, the copper alloy for the thrust bearing may be composed of, by mass percent, 20 to 45% of Zn, 0.3 to 2.0% of Si, 1.0 to 6.0% of Mn, and the balance being Cu and inevitable impurities.

Since Zn contributes to wear resistance, Zn is contained in a range of 20 to 45%. If Zn content is less than 20% by mass, wear resistance becomes insufficient. If Zn content exceeds 45% by mass, the material becomes brittle. Preferably, the content of Zn is in a range of 28 to 40% by mass.

Si reacts with Mn to form a compound contributing to improved wear resistance, and thus Si is contained in a range of 0.3 to 2.0% by mass. If the content of Si is less than 0.3% by mass, a less amount of the Mn—Si-based compound is formed, and unsatisfactory wear resistance is achieved. If the content of Si exceeds 2.0% by mass, the Mn—Si-based compound is excessively formed, and the material is made brittle. Preferably, the content of Si is in a range of 0.6 to 1.4% by mass.

Mn reacts with Si to form a compound contributing to improved wear resistance, and thus Mn is contained in a range of 1.0 to 6.0% by mass. If the Mn content is less than 1.0% by mass, a less amount of the Mn—Si-based compound is formed, and unsatisfactory wear resistance is achieved. If the Mn content exceeds 6.0% by mass, the material becomes brittle. Preferably, the Mn content is in a range of 2.0 to 4.0% by mass.

Preferably, at least one selected from Fe, Al, Ni, Sn, Cr, Ti, Mo, Co, Zr and Sb may be contained in the copper alloy for the thrust bearing, in a total amount of not more than 10% by mass. These elements contribute to strengthening of the matrix of the copper alloy. However, the effect can not be obtained if the content of these elements is less than 0.1% by mass. If the content of these elements exceed 10% by mass, the material becomes brittle. In addition, these elements may be combined with Mn or Si to form compounds. The needle-like Mn—Si-based compound in the invention may include a compound with the elements.

Preferably, a total amount of not more than 10% by mass of at least one selected from Pb and Bi may be contained in the copper alloy of the thrust bearing. These elements contribute to improving lubricity. If the content is less than 0.1% by mass, the effect cannot be obtained. If the content exceeds 10% by mass, the effect is lost.

DETAILED DESCRIPTION OF THE INVENTION

Figure 1:
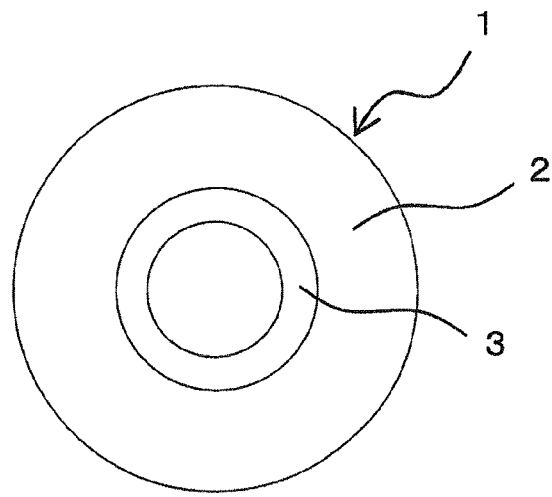
FIG. 1 is a plane view of a thrust bearing.

Examples A to E each using a copper alloy according to an embodiment of the invention and comparative examples F to H were prepared and measured of angles of the major axis direction of the needle-like Mn—Si-based compound and the average distances between grains of the compound. Furthermore, a seizure test with using a bearing test machine shown in Table 1 was performed. The compositions of the examples A to E and comparative examples F to H are shown in Table 2. For the examples A to E and comparative examples F to H, ingots were cast having the compositions in Table 2, and subjected to hot extruding to obtain cylindrical thrust bearings. In the casting, a needle-like Mn—Si-based compound was crystallized in a brass matrix of the copper alloy. The casting was performed so that the needle-like Mn—Si-based compound was made parallel to extruding direction during the hot extruding. Thereafter, when hot forging to the bearing shape, a major axis of the needle-like Mn—Si-based compound in the vicinity of the sliding portion 3 was controlled by controlling an amount of plastic deformation of the sliding portion 3 as described below. In addition, by varying conditions for the casting, hot extruding and hot forging, the angle of the major axis direction in the sectional view perpendicular to the surface of the sliding portion and the average distances between the needle-like Mn—Si-based compound on the surface of the sliding portion can be controlled to have the values shown in Table 3.

TABLE 1

| Testing machine | Bearing test machine |
| --- | --- |
| Peripheral speed | 10 m/s |
| Load | Cumulated load (3 MPa/10 minutes) |
| Lubricant | Engine oil |
| Lubricant temperature | 100° C. |
| Test piece dimensions | Outer diameter of sliding part φ 30 |
|  | Inner diameter of sliding part φ 25 |
|  | Thickness 3 mm |

TABLE 2

| | Material | Chemical composition (by mass percent) | | | | | | | | | | | | | | |
| --- | --- | --- | --- | --- | --- | --- | --- | --- | --- | --- | --- | --- | --- | --- | --- | --- |
| | | Cu | Zn | Mn | Si | Fe | Al | Ni | Sn | Cr | Ti | Mo | Co | Zr | Sb | Pb | Bi |
| Example | A | Balance | 30.0 | 2.0 | 0.8 | 0.12 | 2.3 | — | 0.01 | — | — | — | — | — | — | — | 0.80 |
| | B | Balance | 37.0 | 3.1 | 1.0 | 0.07 | 1.0 | 0.1 | 0.10 | — | — | — | — | — | — | 0.10 | — |
| | C | Balance | 32.0 | 2.5 | 0.4 | 0.04 | 1.7 | 0.5 | — | — | 0.1 | — | — | 0.02 | — | — | 1.20 |
| | D | Balance | 24.0 | 1.6 | 0.5 | — | 3.2 | — | — | 0.2 | — | — | 0.1 | — | — | 2.10 | — |
| | E | Balance | 34.0 | 4.3 | 1.4 | — | 0.2 | — | — | — | — | 0.08 | — | — | 0.02 | — | 0.30 |
| Comparative example | F | Balance | 22.0 | 1.6 | 0.3 | 0.01 | 2.0 | 1.0 | 0.30 | — | — | 0.01 | 0.02 | — | — | 2.50 | — |
| | G | Balance | 40.0 | 1.2 | 0.4 | — | — | 1.3 | 0.50 | 0.1 | 0.1 | — | — | — | — | — | 0.01 |
| | H | Balance | 28.0 | 2.4 | 1.2 | 0.30 | 1.2 | 0.5 | — | — | — | — | — | 0.02 | 0.03 | 0.02 | — |

TABLE 3

| | Material | Ratio of Mn—Si-based compound having angle of major axis direction of 30° to 150° (%) | Ratio of Mn—Si-based compound having angle of major axis direction of 45° to 135° (%) | Average distance between grains of Mn—Si-based compound (μm) | Critical pressure for Seizure (MPa) |
| --- | --- | --- | --- | --- | --- |
| Example | A | 100 | 92 | 15 | 20 |
| | B | 83 | 61 | 23 | 19 |
| | C | 78 | 31 | 21 | 16 |
| | D | 71 | 28 | 97 | 13 |
| | E | 64 | 25 | 4 | 12 |

TABLE 3-continued

|  | Material | Ratio of Mn—Si-based compound having angle of major axis direction of 30° to 150° (%) | Ratio of Mn—Si-based compound having angle of major axis direction of 45° to 135° (%) | Average distance between grains of Mn—Si-based compound (μm) | Critical pressure for Seizure (MPa) |
|---|---|---|---|---|---|
| Comparative example | F | 43 | 15 | 25 | 8 |
|  | G | 34 | 9 | 94 | 6 |
|  | H | 0 | 0 | 46 | 6 |

Figure 2:
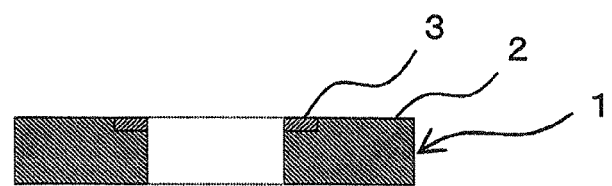
FIG. 2 is a sectional view of the thrust bearing of FIG. 1.
Figure 3:
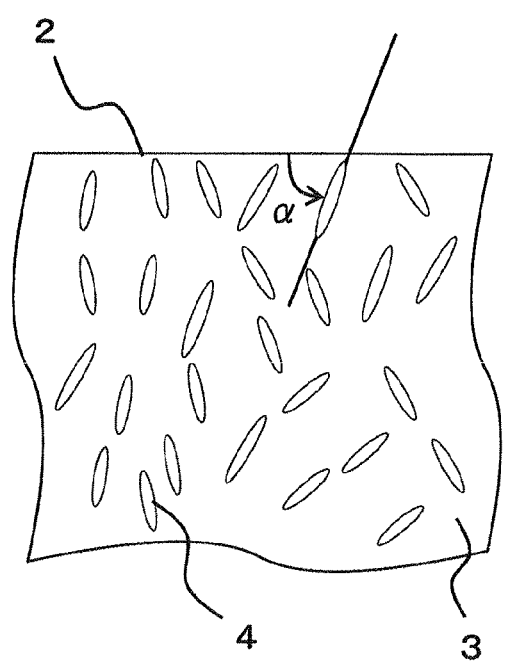
FIG. 3 is a sectional view of a sliding portion in the thrust bearing according to the invention.

As shown in the FIGS. 1 and 2, the cylindrical thrust bearing 1 fabricated by casting and processed by hot extrusion has a sliding portion 3 in a sliding surface 2, which contacts an internal diameter of the sliding surface 2. The sliding portion 3 is used for sliding on a thrust collar of a turbocharger. The hot forging process is performed so that an angle α becomes from 30 to 50 degrees ($30° \leq \alpha \leq 150°$) in a sectional view in a direction perpendicular to the surface 2 of the sliding portion 3, as shown in FIG. 3, where the angle α (hereinafter, referred to as "the angle of the major axis direction of the needle-like Mn—Si-based compound 4") is defined as an angle between the major axis direction of the needle-like Mn—Si-based compound 4 extending from the inside of the sliding portion 3 to the surface 2 and the surface 2 of the sliding portion 3.

For each of examples A to E and comparative examples F to H, the angle of the major axis direction of the needle-like Mn—Si-based compound 4 was measured to determine what ratio of the needle-like Mn—Si-based compound 4 dispersed in a region from the surface 2 of the sliding portion 3 to a depth of 50 μm has the major axis direction making the angle α of 30° to 150° with the surface 2 of the sliding portion 3, in a cross section perpendicular to the surface 2 of the sliding portion 3. In addition, as the average distance between grains of the needle-like Mn—Si-based compound 4, an average value of the distances between a grain of the needle-like Mn—Si-based compound 4 on the surface 2 of the sliding portion 3 and closest other grain was measured. These measurement can be performed by taking composition images of the cross section of the bearing sliding portion 3 and the surface 2 of the sliding portion 3 of the bearing by using an electronic microscope at 200 magnification, and by image analysis from the composition images with use of a common image analyzing technique (analyzing software: Image-Pro Plus (Version 4.5) made by Planetron Co.) or the like. The results of the measurements are shown in Table 3.

Furthermore, for the examples A to E and the comparative examples F to H, seizure test using a bearing test machine was performed under the conditions shown in Table 2. Thrust bearing was determined to generate seizure when a temperature of a back face thereof rises to 250° C. Critical load (contact pressure) at which no seizure occurs are shown in Table 3.

In the examples A to C, a ratio of the needle-like Mn—Si-based compound having the major axis direction making the angles of 30° to 150° with the surface of the sliding portion was controlled to be not less than 50%, and the average distance between grains on the surface of the sliding portion was controlled to be 5 to 80 μm. In addition, in the examples A and B, a ratio of the needle-like Mn—Si-based compound having the major axis direction making an angle of 45° to 135° with the surface of the sliding portion was controlled to be not less than 50%.

In the example D, the ratio of the needle-like Mn—Si-based compound having the major axis direction making an angle of 30° to 150° with the surface of the sliding portion was controlled to be not less than 50%, but the average distance between grains of the needle-like Mn—Si-based compound on the surface of the sliding portion was controlled to exceed 80 μm.

In the example E, the ratio of the needle-like Mn—Si-based compound having the major axis direction making an angle of 30° to 150° with the surface of the sliding portion was controlled to be not less than 50%, but the average distance between grains of the needle-like Mn—Si-based compound on the sliding portion was controlled to be less than 5 μm.

In comparative examples F to H, the ratio of the needle-like Mn—Si-based compound having the major axis direction making the angle of 30° to 150° with the surface of the sliding portion was controlled to be less than 50%.

As shown in Table 3, in the seizure test, the examples A to E where the ratio of the needle-like Mn—Si-based compound having the major axis direction making an angle of 30° to 150° with the surface of the sliding portion is not less than 50% has a high seizure resistance, while the comparative examples F to H where the ratio is less than 50% has a low seizure resistance.

When the surface of the sliding portion was observed after the seizure test, fewer liner scars were formed on the surface of the sliding portion in examples A to E than in the comparative examples F to H. In particular, as the ratio of the needle-like Mn—Si-based compound having the major axis making an angle of 30° to 150° with the surface of the sliding portion is higher, fewer liner scars were observed. By controlling, in the processing, the angle between the direction of the major axis of the needle-like Mn—Si-based compound extending from the inside of the sliding portion to the surface thereof and the surface of the sliding portion to be 30° to 150°, only a part of the surface area of the grains of the needle-like Mn—Si-based compound in the vicinity of the surface of the sliding portion exposes on the surface of the sliding portion and most of the surface area of the grains contact a brass matrix so that the grains are bound to the matrix. As a result, detachment of the needle-like Mn—Si-based compound from the surface of the sliding portion can be restricted during sliding. Furthermore, in the examples A and B, the ratio of the needle-like Mn—Si-based compound having the major axis direction making an angle of 45° to 135° with the surface of the sliding portion was controlled to be not less than 50%. Thus, it is assumed that detachment of the needle-like Mn—Si-based compound can be restricted more effectively, leading to a higher seizure resistance.

In the example D, seizure resistance was not so improved in comparison with the examples A to C. The surface of the sliding portion after the test of the example D had partly metallic luster. This is assumed that the homogenate sulfide film could not be formed on the entire surface of the sliding portion during sliding since the average distance between grains on the surface of the sliding portion is long. For examples A to C, on the other hand, since the average distance between grains on the surface of the sliding portion is made 5 to 80 μm, a nonmetal sulfide film is formed so that sliding on metal surfaces to each other was prevented between the bearing and a counter shaft, and the seizure resistance could be improved.

Also for the example E, the seizure resistance was not so improved in comparison with examples A to C. This is assumed that the size of needle-like Mn—Si-based compound on the surface of the sliding portion become too small as a whole.

From the results, it is considered that the seizure resistance can be more improved when the average distance between grains of the needle-like Mn—Si-based compound is optimized (5 to 80 μm) on the surface of the sliding portion.

The invention claimed is:

1. A thrust bearing for a turbocharger of an internal-combustion engine, made of a copper alloy comprising
    a brass matrix and elongated Mn—Si-based compound parts dispersed in the brass matrix,
    wherein not less than 50% of the elongated Mn—Si-based compound parts are dispersed in a region from a surface of a sliding portion of the thrust bearing to a depth of 50 μm, and
    have a major axis extending from an inside of the sliding portion to the surface of the sliding portion,
    the major axis making an angle of 30° to 150° with the surface of the sliding portion when observed in a sectional view perpendicular to the surface of the sliding portion.

2. The thrust bearing according to claim 1, wherein an average distance between elongated Mn—Si-based compounds on the surface of the sliding portion is 5 to 80 μm.

3. The thrust bearing according to claim 1, wherein the copper alloy consists of, by mass percent:
    20 to 45% of Zn;
    0.3 to 2.0% of Si;
    1.0 to 6.0% of Mn;
    optionally at least one selected from Fe, Al, Ni, Sn, Cr, Ti, Mo, Co, Zr and Sb in a total amount of not more than 10%;
    optionally at least one selected from Pb and Bi in an total amount of not more than 10%; and
    the balance being Cu and inevitable impurities.

* * * * *